United States Patent [19]
Graf et al.

[11] 3,761,666

[45] Sept. 25, 1973

[54] HEATED DRAWROLL FOR DRAW-TWISTING, DRAW-WINDING AND SPIN-DRAW-WINDING MACHINES

[75] Inventors: Felix Graf, Winterthur; Kurt Hablutzel, Wiesendangen; Armin Wirz, Dietlikon, all of Switzerland

[73] Assignee: Rieter Machine Works, Ltd., Winterthur, Switzerland

[22] Filed: Oct. 2, 1972

[21] Appl. No.: 294,208

[52] U.S. Cl. ........................... 219/10.49, 219/10.61
[51] Int. Cl. ............................................. H05b 5/00
[58] Field of Search .................... 219/10.49, 10.61, 219/469

[56] References Cited
UNITED STATES PATENTS

| | | | |
|---|---|---|---|
| 3,412,229 | 11/1968 | Seagrave | 219/10.61 |
| 3,632,947 | 1/1972 | Graf | 219/10.61 |
| 3,441,702 | 4/1969 | La Bretoniere | 219/10.61 |

*Primary Examiner*—J. V. Truhe
*Assistant Examiner*—B. A. Reynolds
*Attorney*—Hugh A. Chapin et al.

[57] ABSTRACT

The temperature gauge is isolated from the induction coil by means of a temperature compensating element which is heated to the temperature of the drawroll so as to eliminate any cooling effect created by the induction coil. The temperature compensating element can be in the form of a short circuit ring which is of greater length than the temperature gauge or in the form of a resistance heating element. In addition, a heat insulating sleeve can also be disposed between the temperature compensating element and the induction coil.

10 Claims, 3 Drawing Figures

HEATED DRAWROLL FOR DRAW-TWISTING, DRAW-WINDING AND SPIN-DRAW-WINDING MACHINES

This invention relates to a heated drawroll for draw-twisting, draw-winding and spin-draw-winding machines and more particularly, to a temperature gauge mounting arrangement within a heated drawroll for such machines.

Drawrolls for draw-twisting, draw-winding and spin-draw-twisting machines have been known, for example, in U.S. Pat. No. 3,632,947, in which an induction coil of an inductive heating device is mounted in stationary fashion within a rotatable drawroll in order to heat the jacket of the drawroll. Heretofore, in order to determine the temperature of the drawroll jacket, a stationary measuring gauge has been arranged between the inside of the drawroll jacket and the induction coil surface with a radial clearance being maintained with respect to both the jacket and induction coil surface. For example, in order to obtain a contact free measurement of the drawroll jacket temperature, an arrangement has been known in which a temperature gauge of flat shape has been axially disposed at about the middle of the roll in facing relation to the inside surface of the drawroll jacket with a small clearance between the gauge and the jacket and with insulation between the gauge and the induction coil. However, it has been found, that the temperature indicated by such an arrangement does not accurately correspond to the effective temperature of the drawroll jacket, especially after a relatively long period of time after heating of the drawroll started. been stated. The cause of this undesireable situation has been found in that the temperature increase of the induction coil caused by the current heat losses (as defined by Joule's law $P = i^2r$; wherein $i$ is a current and $r$ the resistance in the coil) occurs not only very slowly but also very much slower in any case than the inductive temperature increase in the drawroll jacket. Thus, the air flowing gauge the temperature measuring guage in the clearance between the inside surface of the drawroll jacket and the induction coil has been heated by the drawroll jacket and cooled by the induction coil. Thus, the air has been brought to an intermediate temperature. In the above arrangement, where a shielding of the temperature gauge against the induction coil by means of an air gap or by means of a thin electrically non-conductive heat-insulating foil is used, a partial avoidance of this situation, but not an entirely satisfactory solution, has been achieved.

Accordingly, it is an object of the invention to eliminate the disadvantages still inherent in the temperature gauge mounting arrangement mentioned.

It is another object of the invention to eliminate a differential thermal effect on a temperature gauge disposed between a jacket and an induction coil of a drawroll.

It is another object of the invention to obtain accurate temperature readings of the jacket of a rotatable drawroll during use.

It is another object of the invention to eliminate one-sided cooling of a temperature gauge within a drawroll.

Briefly, the invention provides a temperature gauge mounting arrangement for a drawroll having a rotatable jacket and a stationary induction heating device with an induction coil within the jacket. The mounting arrangement includes a temperature measuring gauge positioned between the jacket and induction coil for measuring the temperature of the jacket when heated by the induction coil as well as at least one temperature compensating means disposed between the gauge and the induction coil in spaced radial relation to the induction coil for heating to the same temperature as the jacket. The temperature compensating means is mounted in a stationary manner with a radial clearance from the induction coil such that the compensating means is maintained at approximately the temperature of the jacket, while also following temperature changes of the jacket, in order to impart the same temperature effect on both sides of the temperature gauge without cooling.

In one embodiment, the temperature compensating means is in the form of a short circuit ring of electrically conductive non-magnetic material which is heated by the induction coil in a similar manner as in the drawroll jacket. The ring is disposed about the induction coil in spaced relation to define a clearance and is of a length extending over at least the length of the gauge. In addition, a heat insulating sleeve can be disposed in the clearance between the induction coil and the short circuit ring in order to insure isolation of the ring from any unwarranted thermal effects due to its proximity to the induction coil.

In another embodiment, the temperature compensating means includes an electrical resistance heating element between the temperature gauge and the induction coil and a controlled electrical energy source connected to the heating element to heat the heating element to the same temperature to which the drawroll jacket is heated by the induction coil. This energy source is separate from the energy source for the induction coil.

In order to further eliminate cooling effects on the temperature gauge, one or more air flow throttle elements can be in the space between the induction coil and drawroll jacket. These throttle elements can be formed of ring discs of heat insulating material and/or of electrically conductive non-magnetic material.

These and other objects and advantages of the invention will become more apparent from the following detailed description and appended claims taken in conjunction with the accompanying drawings in which:

Figure 1:
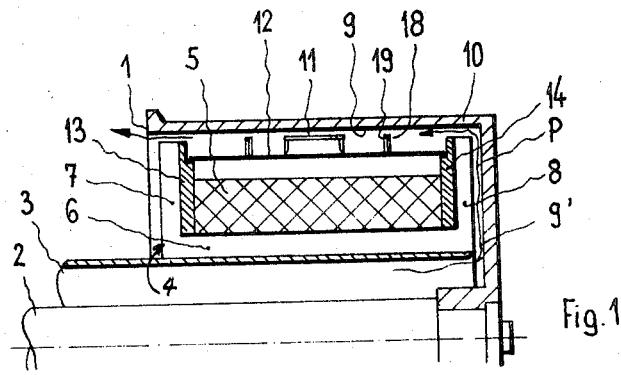
FIG. 1 illustrates a cross-sectional view of a drawroll having a temperature gauge mounting arrangement according to the invention.

Referring to FIG. 1, a drawroll 1 which is formed substantially by a hollow cylinder having one closed end face has a cylindrical outer surface which serves as a thread contacting surface. The drawroll 1 is arranged on and is rigidly connected by screws to a drive shaft 2 which is rotatably supported in a machine frame (not shown). The drawroll 1 is heated in a known manner by means of an induction heating device 4 which is mounted onto a suitable support 3 inside the drawroll 1. The support 3 is fixedly mounted to the machine frame so as to be stationary. The induction heating device 4 substantially contains an induction coil 5 and a magnetically conductive coil core 6 provided with flanges 7 and 8 which extend radially outwards into close vicinity of an inside surface 9 of the drawroll jacket 10 with which the heating device 4 forms a magnetic induction circuit. A temperature measuring gauge 11, known as such and of suitably flat shape, is mounted in the clearance between the induction coil 5 and the jacket inside surface 9 in a suitable manner known as such, e.g. on the induction heating device 4 so as to be mounted in stationary relation to the machine frame. The clearance between the gauge 11 and the jacket inside surface 9 is kept small while the clearance between the gauge 11 and the surface of the induction coil 5 is kept at least as large, or preferably larger. In addition, the temperature gauge 11 is arranged about at the middle of the induction coil 5 between the flanges 7 and 8.

In order to prevent an undesireable bias of the temperatures measured by the measuring gauge 11 due to the different heating or cooling effects by the air on the sides of the gauge 11 facing the roll jacket inside surface 9 and the surface of the induction coil 5, a temperature compensating means is inserted between the gauge 11 and the surface of the coil 5. As shown, the temperature compensating means is in the form of a short circuit ring 12 made from an electrically conductive material but magnetically as non-conductive as possible, e.g. made from stainless steel. A radial clearance is maintained between the ring 12 and the surface of the coil 5 and the ring 12 is mounted on the induction heating device 4 in a fixed manner. A further radial clearance could also be provided between the ring 12 and the temperature measuring gauge 11. In any case, however, the arrangement is chosen such, that the temperature of the temperature compensating ring 12 at least approximately corresponds to the temperature of the drawroll jacket 10 and follows the temperature changes of the jacket 10.

Since the drawroll 1 must be heated up to the jacket temperature needed as fast as possible, particularly during start-up of a machine after a prolonged down time, and since fast or intense heating up of the induction coil turns generally is undesireable, the temperature compensating ring 12 is of a nature so as to be heated simultaneously with, and in correspondence to, the drawroll jacket 10. Accordingly, the dimension of the temperature compensating ring 12 in the direction of the axis of the heating induction coil 5 must be at least equal to, or larger than, the dimension of the temperature measuring gauge 11 in the same direction.

The short circuit ring 12 is dimensioned in the axial direction to extend over the distance between the two core flanges 7, 8 and is supported by insulating discs 13, 14 arranged on the mutually facing sides of the flanges 7, 8. In this arrangement, no insulating material is required in the clearance between the ring 12 and the surface of the coil 5.

Figure 2:
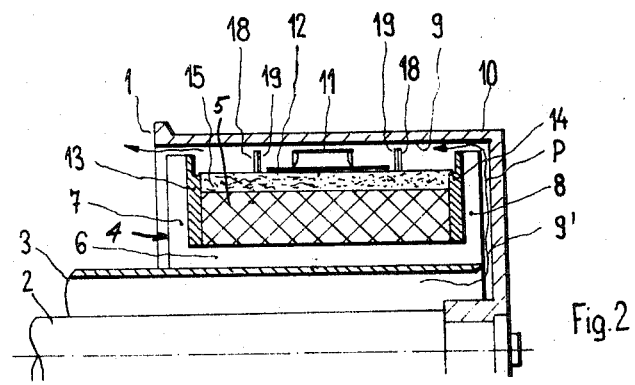
FIG. 2 illustrates a cross-sectional view of a modified mounting arrangement utilizing a heat insulating sleeve according to the invention.

Referring to FIG. 2, wherein like reference characters indicate like parts as above, instead of having one single short circuit ring 12 extending over the whole distance between the two core flanges 7, 8 and surrounding the induction coil 5 completely with a free clearance being maintained, the coil 5 can be surrounded by a sleeve 15 made from heat insulating material, e.g. from glass roving or similar materials, and extending over the full length of, and directly contacting the surface of the coil 5. In such an arrangement, a short circuit ring 12' is provided between the measuring guage 11 and the heat insulating material sleeve 15. The axial length of the short circuit ring 12' is chosen to be smaller than the distance between the core flanges 7 and 8 but larger than axial dimension of the measuring gauge 11. In addition, a radial clearance is maintained between the short circuit ring 12' and the measuring gauge 11. According to the dimensions of the measuring gauge 11 chosen, one or more additional short circuit rings can be provided at suitable mutual distances, their shape and dimensions being the same or differing. As a minimum axial dimension of a short circuit ring 12', the axial dimension of the measuring gauge 11 is to be considered.

Figure 3:
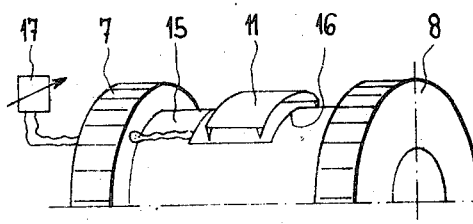
FIG. 3 illustrates a perspective view of an induction heating device having a modified temperature compensating means according to the invention.

Referring to FIG. 3, wherein like reference characters indicate like parts as above, instead of using a short circuit ring, the temperature compensating means can be in the form of a resistance heating element 16 which is arranged directly on the heat insulating sleeve 15 with a radial clearance being maintained between the resistance heating element 16 and the temperature gauge 11. In order to adjust the temperature of the heating element 16 to that of the drawroll jacket 10, the heating element 16 is connected to a suitable separate electrical energy source 17 which can be controlled e.g. as a function of the preset temperature of the drawroll jacket 10.

In all the embodiments described above, the temperature measuring gauge 11 is connected in a known manner with a suitable indicating and/or control device which is not subject or part of the present invention and therefore is not further described. In addition, in all the embodiments described above, the temperature measuring gauge 11 and temperature compensating means generally and particularly the compensating ring 12 and heating element 16 can be arranged in mutual direct contact instead of with a clearance therebetween.

In order to avoid undesireable cooling of the drawroll jacket 10 and the temperature measuring gauge 11 by a possible air flow generated under the influence of a fan action of the inside face surface 9' of the drawroll 1 and flowing in the direction indicated by the arrow P, additional insulating ring discs 18 and/or ring disc shaped short circuit rings 19 can be provided, in addition to the two insulating discs 13 and 14 arranged on the mutually facing flange sides 7, 8 of the induction core, in the clearance limited on one side by the roll jacket inside surface 9 and on the other side by the short circuit ring 12 (FIG. 1) or by the heat insulating sleeve 15 (FIG. 2). These rings 18 and discs 19 act as air flow throttle elements to reduce the passage of air across the gauge 11.

In operation, adaptation of the temperature of the temperature compensating means to the temperature of the drawroll jacket 10 is effected by correspondingly adapting the heating energy needed to compensate for the cooling of the air on the surface of the induction coil 5. With the short circuit rings 12 and 19, this can be effected e.g. by suitably choosing the material used for the rings according to the specific resistance, the temperature coefficient and the dimensions of the rings. If resistance heating elements 16 are used, the adaption is suitably effected by means of the controlled energy source 17.

The advantage of the drawroll of the invention is seen in that the temperature of the air flowing directly along the temperature measuring gauge 11, and particularly on the side of the measuring gauge 11 facing the coil 5 is automatically adapted to the temperature of the roll jacket 10 by means of the temperature compensating means. Thus, the cooling of the air on the surface of the coil 5, which coil 5 is heated up not only much slower but also remains cooler over a prolonged period of operation is compensated. From this closer coincidence of the temperatures, effective measured roll jacket temperatures result. Also, any possible overheating of the drawroll jacket is prevented which could occur if the temperature measured is too low.

What is claimed is:

1. In combination with a drawroll having a rotatable jacket, an induction heating device having an induction coil stationarily mounted within said jacket for heating said jacket, and a temperature measuring gauge mounted in spaced stationary relation between each said jacket and said induction coil for measuring the temperature of said jacket; at least one temperature compensating means disposed between said gauge and said induction coil in spaced radial relation to said induction coil to be inductively heated to substantially the same temperature as said jacket.

2. The combination as set forth in claim 1 wherein said temperature compensating means is of greater length than said gauge relative to the longitudinal axis of said induction coil.

3. The combination as set forth in claim 1 wherein said temperature compensating means is a short circuit ring of electrically conductive non-magnetic material, said ring being disposed about said induction coil in spaced radial relation to define a clearance therebetween and being of a length extending over at least the length of said gauge.

4. The combination as set forth in claim 1 which further includes a heat insulating sleeve disposed between and in contact with said induction coil and said heat compensating means.

5. The combination as set forth in claim 4 wherein said sleeve extends over the total axial length of said induction coil.

6. The combination as set forth in claim 1 wherein said temperature compensating means includes an electrical resistance heating element between said gauge and said induction coil and a controlled electrical energy source connected to said heating element to heat said element.

7. The combination as set forth in claim 1 which further includes at least one air flow throttle element between said temperature compensating means and said drawroll jacket for reducing the passage of air across said temperature gauge.

8. The combination as set forth in claim 7 wherein said throttle element is a ring disc made of heat insulating material.

9. The combination as set forth in claim 8 which further includes at least one ring disc of electrically conductive non-magnetic material between said temperature compensating means and said drawroll jacket for reducing the passage of air across said temperature gauge.

10. The combination as set forth in claim 1 wherein said temperature compensating means is in contact with said gauge.

* * * * *

UNITED STATES PATENT OFFICE
CERTIFICATE OF CORRECTION

Patent No. 3,761,666   Dated September 25, 1973

Inventor(s)   Felix Graf et al

It is certified that error appears in the above-identified patent and that said Letters Patent are hereby corrected as shown below:

Correct the second inventor's name to read
--Karl Hablutzel--.

Column 1, line 32, after "drawroll" insert --has been--.

Column 1, line 33, delete "been stated."

Column 1, line 40, after "flowing" delete --gauge-- and insert --along--.

Column 1, line 40, "guage" should be --gauge--.

Column 2, line 38, after "be" insert --positioned--.

Signed and sealed this 14th day of May 1974.

(SEAL)
Attest:

EDWARD M. FLETCHER, JR.
Attesting Officer

C. MARSHALL DANN
Commissioner of Patents